US010375135B2

(12) United States Patent
Lee et al.

(10) Patent No.: US 10,375,135 B2
(45) Date of Patent: Aug. 6, 2019

(54) METHOD AND SYSTEM FOR EVENT PATTERN GUIDED MOBILE CONTENT SERVICES

(71) Applicant: INTERDIGITAL TECHNOLOGY CORPORATION, Wilmington, DE (US)

(72) Inventors: Kuo-Chu Lee, Princeton Junction, NJ (US); Shoshana Loeb, Philadelphia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 107 days.

(21) Appl. No.: 15/524,434

(22) PCT Filed: Oct. 28, 2015

(86) PCT No.: PCT/US2015/057757
§ 371 (c)(1),
(2) Date: May 4, 2017

(87) PCT Pub. No.: WO2016/073253
PCT Pub. Date: May 12, 2016

(65) Prior Publication Data
US 2018/0288119 A1    Oct. 4, 2018

Related U.S. Application Data

(60) Provisional application No. 62/076,243, filed on Nov. 6, 2014.

(51) Int. Cl.
*H04L 29/06*     (2006.01)
*H04L 29/08*     (2006.01)
*G06K 9/00*      (2006.01)

(52) U.S. Cl.
CPC ...... *H04L 65/4084* (2013.01); *G06K 9/00536* (2013.01); *H04L 67/125* (2013.01); *H04L 67/22* (2013.01); *H04L 67/38* (2013.01)

(58) Field of Classification Search
CPC ............ G06K 9/00536; H04L 65/4084; H04L 67/125; H04L 67/22; H04L 67/38
See application file for complete search history.

(56) References Cited

U.S. PATENT DOCUMENTS 6,057,856 A    5/2000   Miyashita
7,786,874 B2 * 8/2010  Rodgers .................. G06F 19/00
                                                    340/573.1

(Continued)

FOREIGN PATENT DOCUMENTS

WO    2016/007872    1/2016
WO    2016/025449    2/2016

OTHER PUBLICATIONS

Borbora et al., "User Behavior Modelling Approach for Churn Prediction in Online Games." ASE/IEEE International Conference on Social Computing and ASE/IEEE International Conference on Privacy, Security, Risk and Trust, pp. 51-60 (2012).

(Continued)

Primary Examiner — Patrice L Winder
(74) Attorney, Agent, or Firm — Volpe and Koenig, P.C.

(57) ABSTRACT

A method and system for event pattern (EP) guided content services are disclosed. A service entity may receive sensor events from a plurality of users, the sensor events corresponding to behavior data detected from the plurality of users, identify content creator candidates from among the plurality of users based on a pattern of events which correspond to sensor events received from an active user, select a content creator from among the content creator candidates based on a best match to the pattern of events, transmit a request for content of the selected content creator, deliver (Continued)

content created by the content creator to the active user, and monitor progress of the active user based on a playback of the content by the active user.

19 Claims, 10 Drawing Sheets

(56) References Cited

U.S. PATENT DOCUMENTS

| | | | | |
|---|---|---|---|---|
| 7,967,731 | B2* | 6/2011 | Kil | G06F 19/3481 |
| | | | | 482/8 |
| 8,639,764 | B2* | 1/2014 | Rao | H04L 51/00 |
| | | | | 709/206 |
| 8,702,516 | B2* | 4/2014 | Bentley | H04N 7/18 |
| | | | | 463/39 |
| 8,832,599 | B2 | 9/2014 | Deb | |
| 8,976,007 | B2* | 3/2015 | Dugan | A61B 5/0002 |
| | | | | 340/5.82 |
| 8,977,585 | B2* | 3/2015 | Cavallaro | G01S 5/16 |
| | | | | 706/46 |
| 9,046,917 | B2* | 6/2015 | Senanayake | G06F 3/013 |
| 9,075,911 | B2* | 7/2015 | Mohan | G06F 11/3612 |
| 9,110,958 | B2* | 8/2015 | Brust | G06F 17/30554 |
| 9,171,201 | B2* | 10/2015 | Lake, II | G06Q 50/22 |
| 9,280,640 | B2* | 3/2016 | Nusbaum | G09B 19/00 |
| 9,413,947 | B2* | 8/2016 | Waddington | H04N 5/23206 |
| 9,474,970 | B2* | 10/2016 | Kil | G06Q 10/101 |
| 9,723,381 | B2* | 8/2017 | Swanson | H04Q 9/00 |
| 9,858,584 | B2* | 1/2018 | Jain | G06Q 30/0201 |
| 9,886,871 | B1* | 2/2018 | Rauhala | G09B 19/0038 |
| 9,911,352 | B2* | 3/2018 | Williams | G09B 7/02 |
| 9,999,825 | B2* | 6/2018 | Shachar | G06T 7/20 |
| 2009/0299945 | A1* | 12/2009 | Hangartner | G06N 5/02 |
| | | | | 706/50 |
| 2010/0008639 | A1 | 1/2010 | Greenberg | |
| 2010/0332304 | A1* | 12/2010 | Higgins | G06Q 30/02 |
| | | | | 705/14.16 |
| 2011/0093100 | A1 | 4/2011 | Ramsey | |
| 2014/0100835 | A1* | 4/2014 | Majumdar | G06Q 10/047 |
| | | | | 703/11 |
| 2014/0195949 | A1 | 7/2014 | Baisuck | |
| 2014/0278308 | A1* | 9/2014 | Liu | H04L 67/22 |
| | | | | 703/6 |
| 2014/0372430 | A1* | 12/2014 | Sitruk | G06F 17/30702 |
| | | | | 707/736 |
| 2015/0120023 | A1* | 4/2015 | Terrell, II | A63F 13/5375 |
| | | | | 700/91 |
| 2015/0258415 | A1* | 9/2015 | Trivedi | H04M 1/72522 |
| | | | | 700/91 |
| 2017/0065892 | A1 | 3/2017 | Loeb | |

OTHER PUBLICATIONS

Dangauthier et al., "TrueSkill Through Time: Revisiting the History of Chess," Advances in Neural Information Processing Systems, MIT Press, pp. 931-938 (2008).

Drachen et al., "Game data mining." Game Analytics, Springer London, pp. 205-253 (2013).

Kung et al., "Content Networks: Taxonomy and New Approaches," The Internet as a Large-Scale Complex System, Oxford University Press (2002).

Swan, "Sensor Mania! The Internet of Things, Wearable Computing, Objective Metrics, and the Quantified Self 2.0," Journal of Sensor and Actuator Networks, 1(3), pp. 217-253 (2012).

* cited by examiner

METHOD AND SYSTEM FOR EVENT PATTERN GUIDED MOBILE CONTENT SERVICES

CROSS REFERENCE TO RELATED APPLICATION

This application is the U.S. National Stage, under 35 U.S.C. § 371, of International Application No. PCT/US2015/057757 filed Oct. 28, 2015, which claims the benefit of U.S. Provisional Application No. 62/076,243 filed Nov. 6, 2014, the content of which is hereby incorporated by reference herein.

BACKGROUND

Recent developments in wearable devices such as, for example, the GOOGLE GLASS, IWATCH models, FITBIT wrist bands and the like, have enabled new types of pervasive and personalized services in healthcare, fitness, and training. Combining these wearable devices with three-dimensional (3D) graphics engines, social networking and crowd sourcing platforms, mobile apps and games may contribute towards the emerging trend of real-world activities in 3D virtual worlds and create rich 3D augmented/virtual reality content that may be shared among users of the mobile apps and games. In addition to the content required for the application itself, additional on-line help support content such as tutorials, therapies, recipes, coaching instructions, and warning messages may also be created and delivered together with applications or offered as services to the users.

Some rich 3D content may be used as live coaching tutorials for education, healthcare, fitness, and entertainment purposes. For example, a mobile app or game may support a wearable or bike mounted camera with location and orientation sensors, a microphone for voice activated commands, a wrist band for temperature and heart rate monitoring. In addition, the mobile app or game may detect, recognize and project real-world sensor data to create an avatar in a 3D graphics engine with gesture recognition sensors (e.g., MICROSOFT KINECT, SOFTKINECT Camera, LEAP MOTION Controller and the like). While these new technologies may create much richer content, the technologies may also introduce more complexity for supporting live users in real-time with minimal or no manual intervention.

This rich content may be created using web content and 3D animation recording tools, which may involve multiple manual steps in content design, development, editing, and publishing. The published content may be consumed by users through advertising, search, delivery, and display services.

SUMMARY

A method and system for event pattern (EP) guided content services are disclosed. A service entity, which may include one or more processors, may receive sensor events from a plurality of users, where the sensor events correspond to behavior data detected from the plurality of users, identify content creator candidates from among the plurality of users based on a pattern of events which correspond to sensor events received from an active user, and select a content creator from among the content creator candidates based on a best match to the pattern of events. The service entity may transmit a request for content of the selected content creator. The service entity may deliver the content created by the content creator to the active user and may monitor progress of the active user based on a playback of the content by the active user.

In addition, the service entity may receive automatically sensor events of the active user on a continuous real-time basis, and the service entity may determine automatically from the sensor events whether a user behavior is abnormal. The service entity may generate a behavior model for detecting abnormal behavior based on the received sensor events. Further, if the user behavior is abnormal, the service entity may generate the pattern of events based on the sensor events.

The progress of the requestor entity may be monitored by the service entity. A positive point or rating may be given to the content based on the progress. The system may maintain a set of high ranking content creators and associated recorded content. Older or lower ranked content may be archived and removed.

An EP guided content services system may perform the content selection and matching methods. An application programming interface (API) and a network element may also perform the content selection and matching methods.

BRIEF DESCRIPTION OF THE DRAWINGS

A more detailed understanding may be had from the following description, given by way of example in conjunction with the accompanying drawings wherein.

DETAILED DESCRIPTION

Figure 1A:
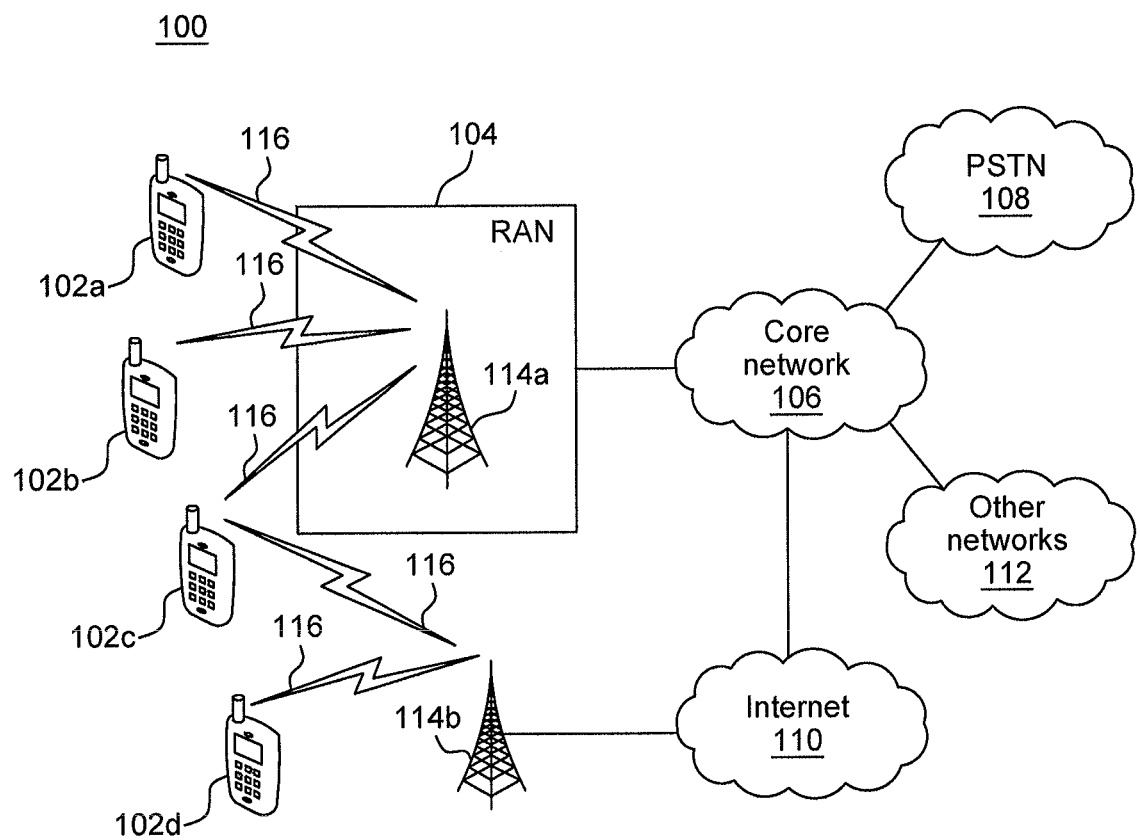
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth.

For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
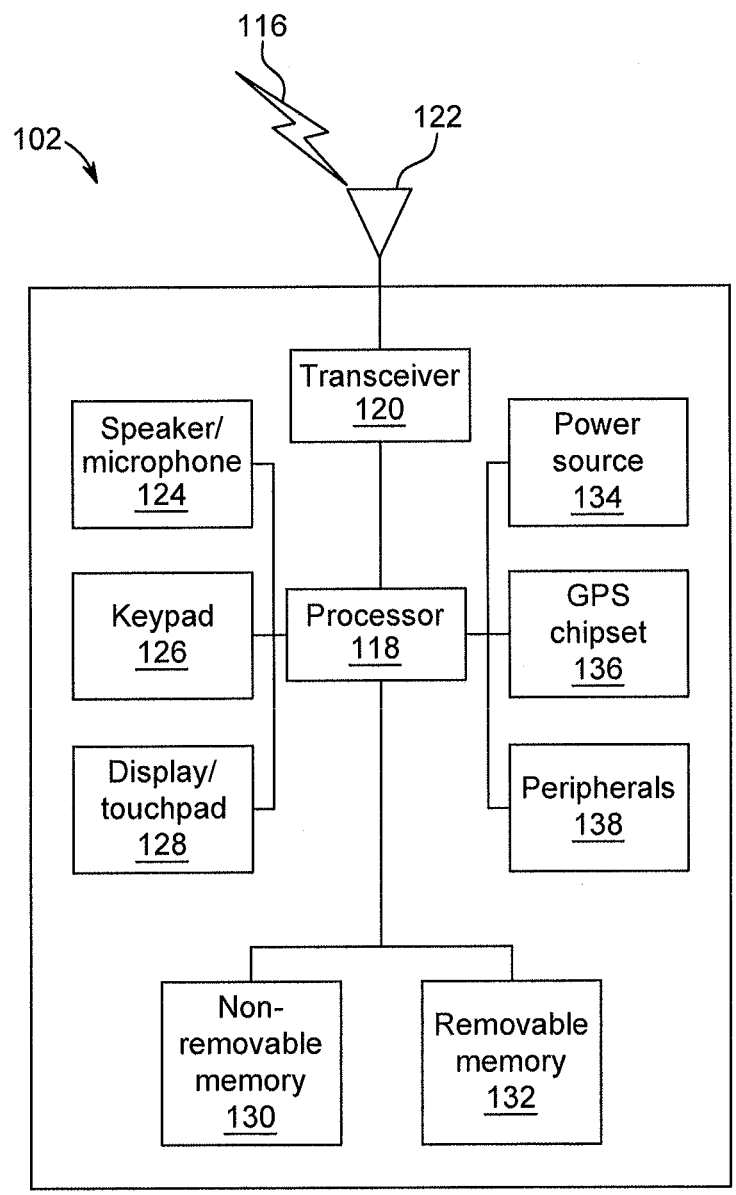
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
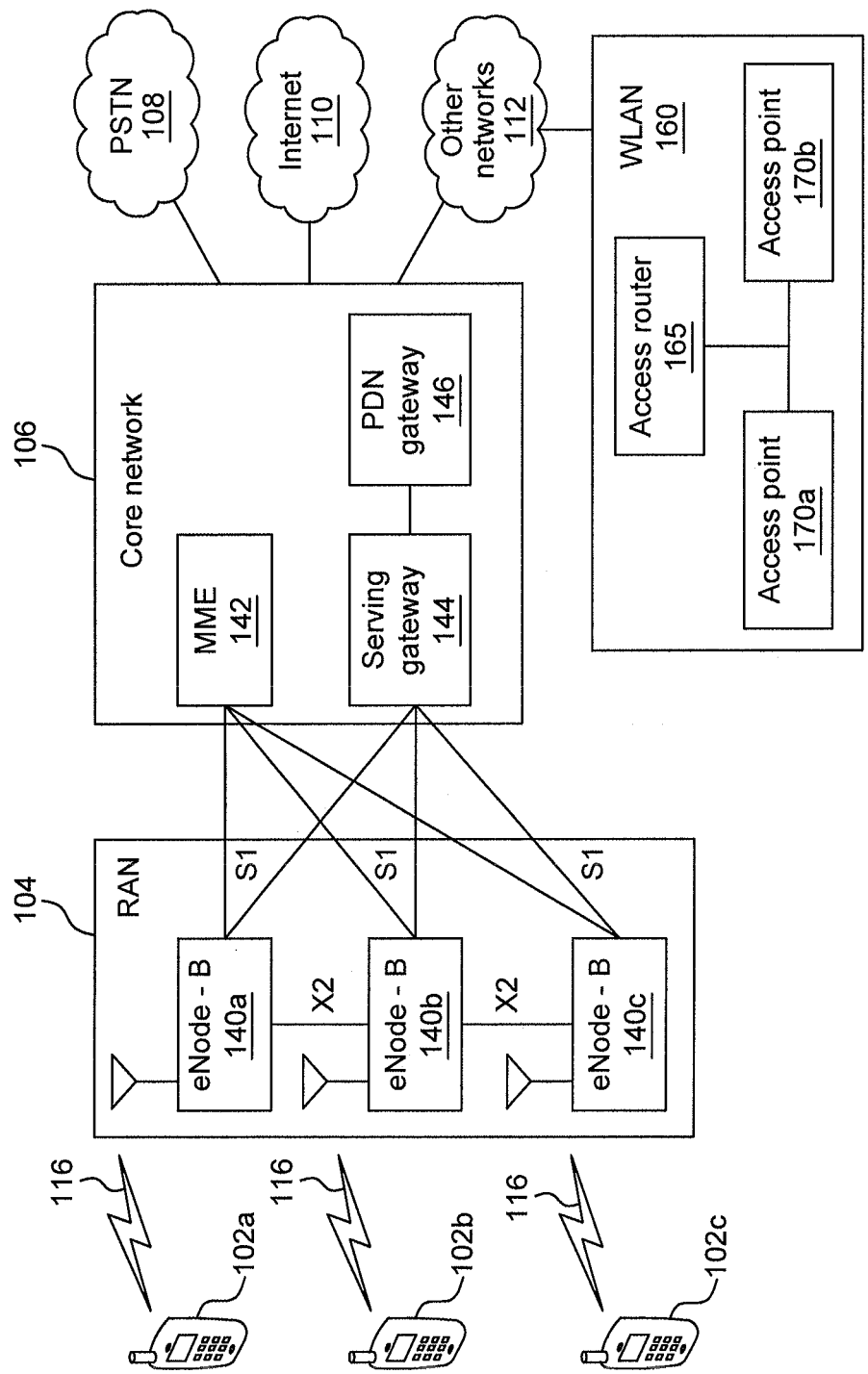
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170*a*, 170*b*. The communication between access router 165 and APs 170*a*, 170*b* may be via wired Ethernet (IEEE 802.3 standards), or any type of wireless communication protocol. AP 170*a* is in wireless communication over an air interface with WTRU 102*d*.

Figure 1D:
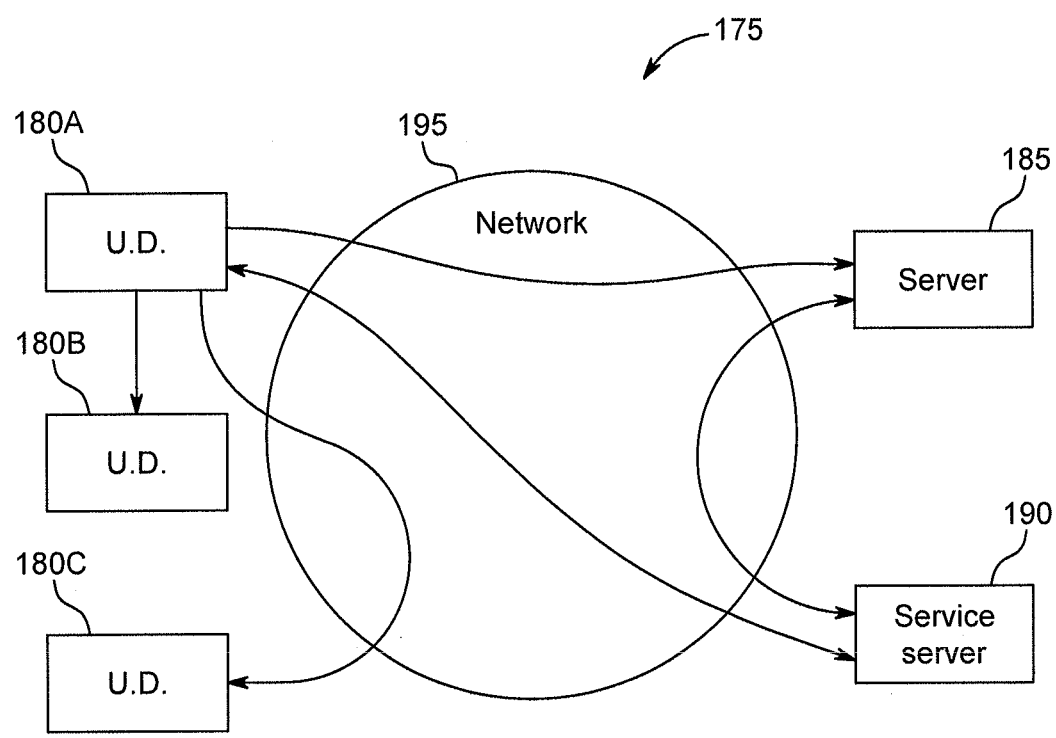
FIG. 1D is a system diagram of an example communications system in which one or more disclosed embodiments may be implemented.

FIG. 1D is a system diagram of an example communications system 175 in which one or more disclosed embodiments may be implemented. In some embodiments, communications system 175 may be implemented using all or a portion of system 100 as shown and described with respect to FIG. 1A.

User device 180*a*, server 185, and/or service server 190 may communicate over communications network 195. These communications may be wireless, wired, or any combination of wireless and wired. Communications network 195 may include the internet 110, core network 106, other networks 112, or any other suitable communications network or combination of communications networks.

User device 180*a* may include a WTRU (such as WTRU 102*a*), or any suitable user computing and/or communications device such as a desktop computer, web appliance, interactive television (ITV) device, gaming console (such as Microsoft XBOX™ or Sony Playstation™) or the like. User device 180*a* and/or applications executing on user device 180*a* may generate events such as mouse clicks, keyboard strokes, and the like. These events may be processed by user device 180*a* and/or may be transmitted to another device such as server 185 or service server 190.

Server 185 may include a web server, application server, data server, or any combination of these or other types of servers. Server 185 may include any suitable server device such as a server computer, personal computer, or the like. Server 185 may host applications accessible to user device 185*a*. For example, server 185 may include a gaming server hosting a massively multiplayer online game (MMOG), an email server, a web server hosting a website such as a social media website or blog, or other types of servers typically accessible by a user device over a computer communications network.

User device 180*a* may access server 185 over computer communications network 175 to interact with services that it provides. For example, user device 180*a* may access a game server hosted on server 185 to participate in a multiplayer online game. Access of server 185 by user device 180*a* may be via a client application executing on user device 180*a* or any other suitable mechanism. In some cases, the server 185 may receive events from user device 180*a*, or may send events to user device 180*a*. For example, the server 185 may send an event to user device 180*a* indicating that additional in-game resources are required for continued play.

Service server 190 may include a web server, application server, data server, or any combination of these or other types of servers hosted on a server device. Service server 190 may include any suitable server device such as a server computer, personal computer, or the like. Service server 190 may be configured to communicate with server 185, for example, over network 195 or any other suitable communications medium. Service server may be co-located with, combined with, or in direct communication with server 185.

Service server 190 may communicate with server 185 to provide services, such as third party services, to users of server 185. For example, a subscriber to a game hosted on server 185 may access server 185 from user device 180A and may subscribe to third party services for the game which are hosted on service server 190.

Service server 190 may be configured to receive and/or intercept events transmitted between user device 180*a* and server 185. For example, in some embodiments server 185 and service server 190 may be configured such that server 185 may send an event destined for user device 180*a* instead or additionally to service server 190, and service server 190 may send the event or another event, signal, or message to device 180*a*. For instance, in a case where server 185 includes a game server, server 185 may send an event to service server 190 indicating a requirement of a user of user device 180*a*, and server 190 may send the event or another signal or message to device 180*a* indicating that a resource is available to acquire the requirement. In some embodiments, service server 190 may only forward the event to device 180*a* under certain conditions, such as based on a user preference and/or context information relating to the user of device 180*a*.

In some embodiments, the functions of service server 190 and server 185 may be implemented using the same device, or across a number of additional devices.

In some embodiments, user devices 180*b* and 180*c* may communicate with server 185 and/or service server 190 via user device 180*a*. For example, user device 180*a* may forward a notification message from service server 190 to user device 180*b* via a peer to peer connection and may forward a notification message from service server 190 to user device 180*c* via network 195. In some embodiments, user devices 180*a*, 180*b*, and 180*c* may form a network, such as a peer-to-peer network, and such network may have a mesh topology, a star topology using user device 180*a* as a coordinating node, or any other suitable topology. In such embodiments, the peer-to-peer network may operate independently of server 185 and/or service server 190, and may incorporate functionality that otherwise would be hosted by server 185 and/or service server 190, such as functionality described herein.

Everything that follows may, but is not required to be, employed and/or implemented using one or more, or part of one or more of the example systems discussed above.

As used herein, a content requestor entity may refer to a content requesting entity and the terms may be used interchangeably. As used herein, a content creation entity may refer to a content creator entity or content creating entity and the terms may be used interchangeably. An event pattern (EP) guided mobile content services system may perform the content selection and matching methods disclosed herein. An application programming interface (API) and a network element may also perform the content selection and matching methods disclosed herein.

Web content creation and consumption processes may be decoupled and may be mediated by content delivery networks and service portals (for example, YOUTUBE and TWITCH). Such decoupled processes may not be suitable for pervasive service because the service may not be fast and efficient enough to address the live events and context sensitive issues that the users may encounter in interacting in augmented or virtual environments. It may also be costly for the content developers or producers to develop help menus or tutorials anticipating all possible problem scenarios in advance. In an example, text key word base search engines may be used for the pre-filtering of archived content stored in multiple Websites.

Examples are disclosed herein of efficient real-time customer retention services with event pattern learning, detection and remedial action rules to support users that have difficulties in using the application or playing the game. These services may improve user experiences and customer retention. Further, examples are disclosed herein to use tutorial and third party created credit earning tasks as one type of remedial action. Further, examples are disclosed herein for modified content creation and consumption mechanisms to support automated help content (for example, tutorials and the like) generation for customer retention systems. Example mechanisms may also be generalized and applied to automate content creation needed for pervasive personal services with minimal or no manual operations. Furthermore, example mechanisms may enable new types of automated content brokerage model which may support dynamic selection of qualified content creators to generate sequences of personalized content directly consumable by the users. The dynamically selected content creators may be linked to the content requestor in real-time with knowledge of the context and specific problem the user is facing. This dynamic content creation process may be extended and integrated with the existing content aggregators (for example, YOUTUBE, TWITCH and the like) and search engines (for example, BING, GOOGLE and the like).

Some main challenges in creating tutorial or coaching material or other personalized pieces of content for multiple mobile apps and games using wearable devices are summarized as follows. Pre-made content may not predict all possible user conditions. Mobile apps and games may be shipped with pre-made tutorials and hints. The pre-made content may not cover all the possible use cases and may not be tailored to each user's background, changing environment, and unexpected situations that may happen in real-time in the real world. For example, some mobile games (e.g., PUDDING MONSTERS and the like) may provide hints for different puzzles when players fail the puzzle many times. There may be many different types of problems that different users may face at different situations. Pre-made hints or tutorials covering all cases may require substantial development efforts. Allowing players to request help content at a specific situation from other players directly may reduce the need to create pre-made hints and at the same time may provide personalized service and a sense of social engagement.

Users may also create content dynamically. While dynamically created content may enrich personalized experiences in both the real and virtual worlds for mobile app and game users, such content may also cause information overflow if the content creation process is not controlled and organized with a set of purposes. For example, wearable cameras may record a large amount of video in many different places whenever the users felt like. However, most of the recordings may not be reviewed or shared because most users would not have the time to review most of the recording without a purpose.

A user may consume hands-free immersive content. When a user may encounter problems related to such content consumption, the user may go online and manually search for solutions from other users who may have encountered similar problems. Online content may be consumed from websites (such as, for example, Bing.com, Youtube.com, Twitch.com, Machinima.com and the like) using browsers manually. These tools may not be designed for hands-free operation and may not be convenient to use when using wearable devices (for example, cameras, displays, gesture devices, and the like).

Examples are disclosed herein of system architecture, processes, and methods to automate the dynamic content creation and consumption processes based on requests automatically detected from behavior patterns of mobile app and game users. The automated behavior pattern detections may be supported by the real-time analysis of data collected from a simulated 3D virtual reality world or from a sensor directly. The content creation processes may be performed using the 3D virtual reality graphic tools used in the game engine or other 3D virtual reality graphic engines.

In examples disclosed herein, event patterns (EPs) may be generated by collecting real-time user behavior tracking information, or sensed events, from a user's device, which may or may not be a wearable device, from a monitoring system, such as a camera or global positioning system (GPS) device, or from any other device which is capable of receiving and collecting information corresponding to real-time behavior content of a user. Real-time behavior content may be created (i.e., created content) by tracking the behavior of a first party or multiple first parties to be used to aid, motivate or improve an experience of a second party or multiple second parties. A real-time content request (i.e., requested content) may be generated automatically by a user device of a second party if is it determined from real-time tracking of the behavior of the second party that content created by a first party is desired.

Accordingly, the system disclosed herein may offer content services to two types of entities: the content requestor entities and the content creator entities. The system may automatically allocate content creators from any number of qualified content creator candidates to generate dynamic content to improve user experience, alleviate stress or solve a specific user problem at hand. The content creators may be selected based on "qualifications" that matches the "need" patterns of content requestors. The need patterns may be modeled as a set of attributes used to assess the problems that the user or potential content requestor may encounter. It is noted that "content requestor entity," "content requestor," "potential content requestor," "qualified content requestor candidate," "content requestor participants" or the like may be used interchangeably. Similarly, "content creator entity," "content creator," "potential content creator," "qualified content creator candidate," "content creation participants" or the like may be used interchangeably.

In examples disclosed herein, multiple types of smart sensor data analysis tools may be used by the mobile applications and games to detect user behaviors. Further, in examples disclosed herein, the system may integrate the analysis tools and generate summary event patterns including objective, environment and problems to match participating qualified content creators.

In an example, the system may automate and extend the traditional decoupled content creation and consumption service model. First, from the content creation perspective, the traditional content creation model may be categorized into three different types depending upon the size of an audience. For mass market content, such as video and games, the content may be targeted for a large number of users and consumed based on a user's preference. For community social media, the content may be targeted for social groups and may be consumed by users in the group who are interested in the content. For custom specific content, such as training materials or targeted personal advertisements, the content may be created based on personal need. In all three types of the content creation categories, the content creator or producer may create the content based on their understanding of the user need and the context information, such as market trends, to make decisions on what types of content to create. The larger the audience base, the less specific the content may be to a specific user's problem or preference.

In a further example, from the content consumption perspective, content created for the mass market, a community and specific application domain or interest group, or a specific person may be organized and kept in content service providers. Users may use search engines, feeds, and email to retrieve the content. Information aggregators such as FACE-BOOK, YOUTUBE and TWITCH may provide local search filters to help users filter out a massive amount of information crated and organized in the user support sites or areas. However, each user may need to study the content and decide if the content is from a reputable source before using the content. Each user also may need to check if the published content is up to date and matches the context of user's environment and application.

In examples disclosed herein, the system may enable a pervasive content creation and consumption service model that may automate and extend the traditional content creation and delivery model with a dynamic real-time content creation process. The process may consist of the following functions and features. The process may include dynamic content request generation. Content request may be generated based on observations of user behavior in a specific application context instead of manual search or filtering operation. The observation may be made by analyzing data collected from a set of sensors monitoring the user's motion, gesture, facial expression, vital signs, biometric data, and other types of data collected from other, different types of sensors. The process may also include the dynamic selection of qualified content creators. The content creators may be dynamically selected based on the qualification or skill level required to provide personalized content. In addition, the content creators may be selected based on matching the EPs containing the context information concerning application, user and environment. Further, the process may include personalized and context aware content creation. The content may be created in a similar virtual and physical environment and application context that matches the requested objective, environment and problem descriptions of the content request.

The process may further include seamless hands-free consumption. Content may be created, assembled, annotated and delivered to the user automatically and consumed seamlessly with minimal or no manual operations. The content creation and consumption may be tightly coupled without needing a content aggregator and distributor to store and support search and filtering operations. The process may further include integrated content creation and consumption. Instead of having a content aggregator and search engine to mediate the decoupled content creation and consumption processes, the proposed mechanism may enable integrated content creation and consumption sessions that may persist for the life span of a set of applications and games in a pervasive service environment. The process may further include automated effectiveness rating. The effectiveness of the content created for one user may be rated based on an assessment of progress of the user who consumed the content. This progress assessment is more objective than manual preferences (for example, a "like" and "star" rating used in social media, movie services and the like).

Content creators may provide live or pre-recorded content to the content requestors based on criteria defined by the content creator, content requestor or the content matching service. The content matching service may provide service agents to assist content pre-recording and context extraction to allow customization of criteria for weighted proximity matching and creator content creation and reuse criteria. The weighted proximity matching service may be customizable for each application. The service may define weights, $W_i$ (range from [0-1]) for each of the attributes of a requested content and/or of a content creator with index i used by each application or bundled applications for multi-dimensional proximity distance calculation. Example attributes that may be weighted by $W_i$ include the following: geo-distance, distance in the game world, time difference in synchronization event (e.g., start time of an application task, or completion time of application task), experience level for a specific game, review-score (e.g., a score that may be provided based on the effectiveness of the content to the requestor described in a progress based effectiveness assessment in the competitive content quality improvement services section). Accordingly, selection of content from among different content candidates and content creator candidates may be optimized according to the weighted attributes.

The service may apply weights on the results of the distance calculation. For example, the service may apply the weights W=[0.5, 0, 0, 0.5, 0] for applications which only consider geo-distance and experience level for selecting a content creator for a content requestor. The service may also apply the weights W=[0, 0.25, 0.25, 0.5, 0] for selecting a content creator based on close proximity to the content requestor in time and space of the game world, as well as the experience level of the content creator for the specific application (or game). Further, the service may apply the weights W=[0, 0, 0, 0, 0, 1] for applications independent of time and space, and only the quality of the tutorial for the application may be important. In addition, the service may select the closest content ID and creator IDs (e.g., closest three content creators).

The content matching service may include creator content creation and reuse criteria. The criteria may be used to decide whether to create new content from scratch or use automated pre-recorded content by a content creator. Creating new content may improve the previous content and stay current with the content requestors. Using previous content that works well may build competitive content with a high review-score. The criteria may also be used to decide whether to provide live coaching where the content may be sent to a content delivery queue to be delivered to a user or to deliver archived contents previously stored in the content delivery queue from a previous inquiry to the user. The stored content may be edited based on the EPs. Based on the above criteria, the content service may provide live content or reuse previously created content for the best interests of content creators, service providers, and content requestors.

The system may include a content request model and EP detection. The request patterns of a user may be detected based on sequences of event patterns using multiple types of sensors. Examples of request patterns may be listed as follows. A request pattern may include a normal sequence of events that are expected to happen or that did not happen in a timely manner. A request pattern may also include the detection of abnormal sequences or abnormal values in sensor data. Further, a request pattern may include the detection of problems in the environment or system errors. An example of a data model and event pattern detection is disclosed herein.

Figure 2:
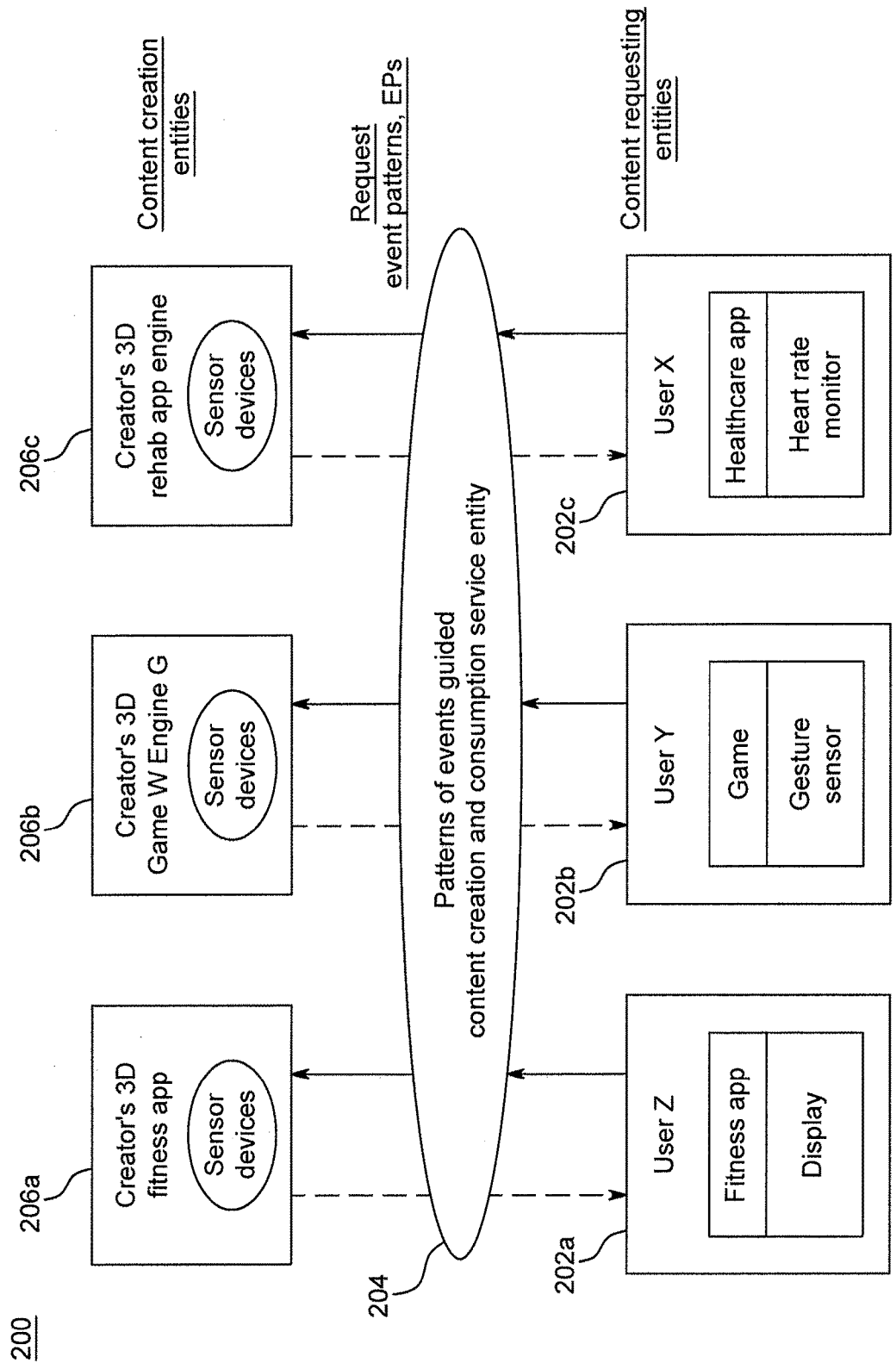
FIG. 2 is a diagram of an example "Pattern of Events" guided content creation and consumption service.

FIG. 2 is a diagram of an example system 200 that includes content requesting entities 202a, 202b and 202c, a patterns of events guided content creation and consumption service 204, and content creation entities 206a, 206b and 206c. The content requesting entities 202a, 202b and 202c and content creation entities 206a, 206b and 206c may be any user device, monitoring device, and/or monitoring system, each of which may include any number of processors, memory devices, input/output devices (e.g., receivers, transmitters and transceivers), sensors (e.g., image, sound, temperature, vital sign, brainwave, location, orientation, and motion), and any combination thereof. For example, the content requestor may also act as content creator. Some of application specific behavior model and event pattern processing functions may be distributed to local servers, devices or sensors such that the service server may focus on processing high level composite models or events from multiple servers, devices, and/or sensors. The patterns of events guided content creation and consumption service 204 may be configured as an automated content collection, matching and distribution module and it may be integrated as a single service providing entity, or may be provided as separate service providing entities corresponding to different use applications. The patterns of events guided content creation and consumption service 204 may include one or more processors coupled to one or more memory devices to perform its functions, and it may include one or more inputs and one or more outputs to receive and/or to output data and information, respectively (e.g., via a receiver, transmitter or transceiver). The patterns of events guided content creation and consumption service 204 may be a server and may include or be implemented with computer-readable storage media that includes program instructions to be implemented by a computer to cause a processor to execute or perform the program instructions. The content requesting entities 202a, 202b and 202c, the patterns of events guided content creation and consumption service 204, and the content creation entities 206a, 206b and 206c may each be configured to be communicatively coupled to one another and communicate with each other, directly or indirectly, via any number of communication channels and communication mediums (e.g., wirelessly and/or by wired connection).

As shown in FIG. 2, a 3D augmented reality enabled fitness application (e.g., a biking or hiking application) may search for other content creation participants among the content creation entities 206a, 206b and 206c for content requestor 202a in the same trail to provide real-time warnings or suggestions to the content requestor 202a. Likewise, a multi-user game application session may look for skilled players among the content creation entities 206a, 206b and 206c who are playing the same game session corresponding to the game play of a content requestor 202b to give real-time suggestions to the content requestor 202b. Likewise, a 3D augmented reality enabled healthcare application (e.g., rehabilitation application) may search for other content creation participants among the content creation entities 206a, 206b and 206c performing the same healthcare activities corresponding to the activities of a content requestor 202c to provide real-time health suggestions to the content requestor 202c. In an example, the skill level or experience level of the content creator and content requestor may be provided by the application or game service. Such skill ranking methods may be used by game systems, such as, for example, XBOX and the like, to match players. The skill level or experience level may also be used as part of the attributes for selecting the qualified content creators. Furthermore, application context may also include avatar and weapon types as additional game specific context attributes.

An example dynamic content creation and consumption services work flow may be described as follows. A set of content requestor entities 202a, 202b and 202c may generate requests to content creation entities 206a, 206b and 206c via the patterns of events guided content creation and consumption service 204. These requests may include event patters (EPs). Upon receiving a set of requests, the patterns of events guided content creation and consumption service 204 may search for qualified content creator candidates among the content creation entities 206a, 206b and 206c based on application tasks and proximity in time and space to the requestor. The patterns of events guided content creation and consumption service 204 may use multiple types of common and application specific attributes in the event patterns to rank the qualified content creator candidates to create and annotate multiple pieces of content and select the most suitable content to deliver to the content requestors 202a, 202b and 202c. Upon selecting the most suitable content from the content creation entities 206a, 206b and 206c, the requested content is delivered to the appropriate content requestor entity 202a, 202b and 202c via the patterns of events guided content creation and consumption service 204 though one or more communication interfaces. For example, the selected content may be annotated with the context information (e.g., activity, time and space) of one or more qualified content creator candidates (i.e., content creation entities 206a, 206b and 206c) and may be received by the patterns of events guided content creation and consumption service 204 from the content creation entity via a communication channel. The selected content and any corresponding context information, which may be stored in the patterns of events guided content creation and consumption service 204, may then by delivered by the patterns of events guided content creation and consumption service 204 to one or more of the content requestor entities 202a, 202b and 202c for consumption (e.g., for audio and/or video playback of the content, or any other utilization configured to convey the content to a user) via another communication channel.

On receiving the content, the requestor entities 202a, 202b and 202c may play back the pieces of content in whole or in steps. The patterns of events guided content creation and consumption service 204 may monitor the progress of the content requestor while the content is being consumed (e.g., via play back) by the content requestor entity. During the play back, the content requestor entity may transmit additional sensor events, progress information and other behavior data to the patterns of events guided content creation and consumption service 204, such that the patterns of events guided content creation and consumption service 204 may analyze the received information and monitor the behavior of the content requestor entity through the analysis. This information received by the patterns of events guided content creation and consumption service 204 may also be used by the patterns of events guided content creation and consumption service 204 to continue dynamically build and adapt behavioral models corresponding to a user environment.

If the content requestor makes progress in the applications (e.g., kill a monster, solve a puzzle, avoid a hazard, or pass a level), a positive point or rating may be given to the received content automatically on the location and context specified in the EPs. If the patterns of events guided content creation and consumption service 204 determines that the delivered content was not effective based on the requestor's progress, a negative point may be given to the received content and a modified request for content may be automatically sent to the content creation entities 206a, 206b and 206c. In response to the modified request, another content creator and/or additional content may be selected and the additional content may be sent to the applicable content requestor entity 202a, 202b and 202c. This automatic rating and monitoring scheme may continue until satisfactory results are achieved by the applicable content requestor entity 202a, 202b and 202c. The location may be a physical location in the real world or a mapped location to the virtual world. For each location and context, the patterns of events guided content creation and consumption service 204 may maintain in a queue stored in a memory device a set of high ranking content creators and associated recorded content created in the past as a history log for future reference. Older or low ranked pieces of content may be archived and removed from the history by the patterns of events guided content creation and consumption service 204.

Figure 3:
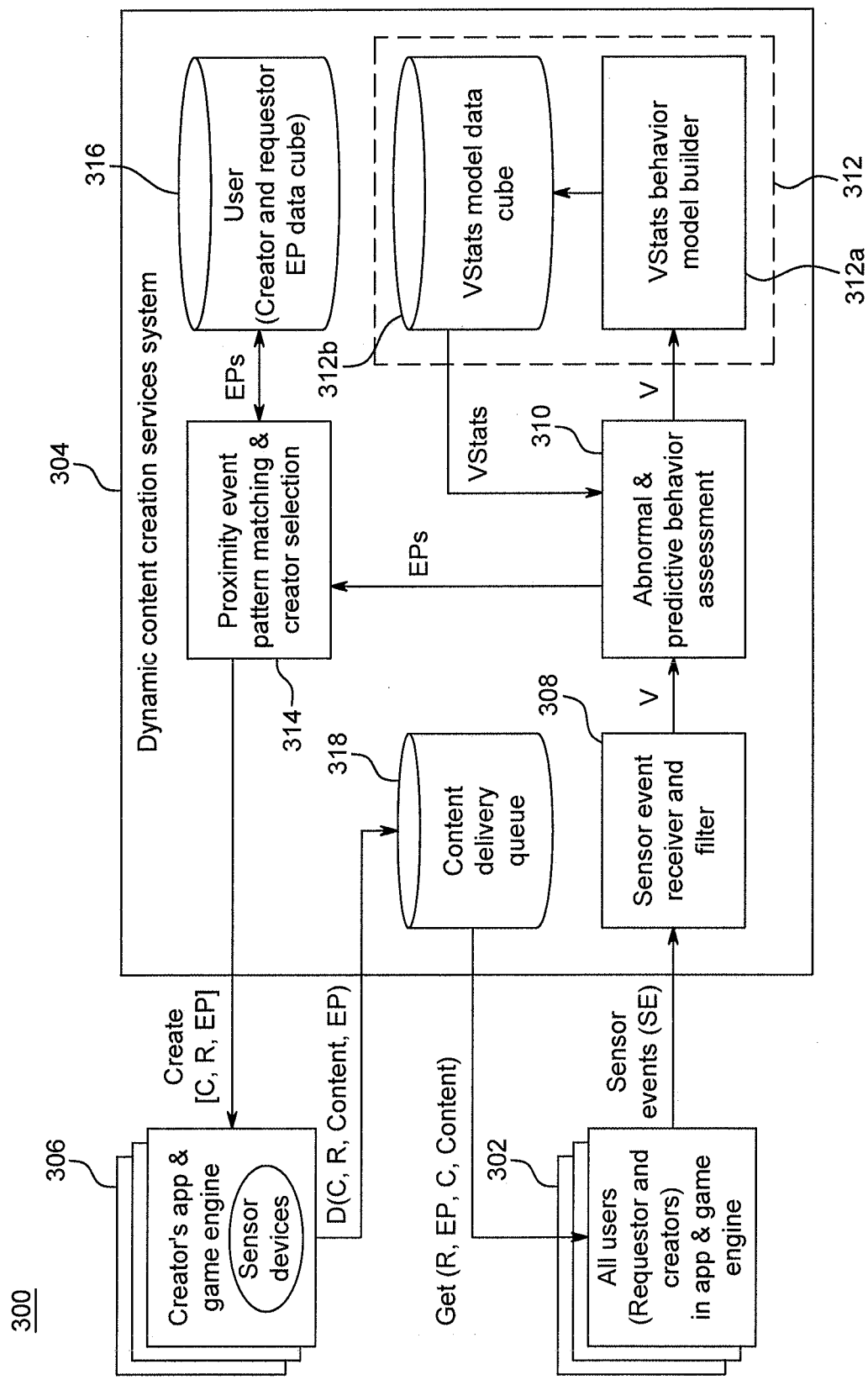
FIG. 3 is a diagram of an example of dynamic event pattern detection and matching.

FIG. 3 is a diagram of an example of dynamic event pattern detection and matching system 300. The system 300 includes user devices 302, a Dynamic Content Services System 304, and content creator devices 306.

The user devices 302 may include both content requestors and content creators that provide sensor events (SE) to the system 304 based on user behavior and/or performance. For example, a user device 302 automatically tracks a behavior of a user and monitors the behavior for an occurrence of a sensor event (SE). Upon detection of a sensor event (SE) occurrence, the user device 302 transmits the sensor event (SE) and any corresponding context information to the system 304 via any appropriate communication interface (e.g., transmitter, transceiver, input/output interface, and the like) through a communication medium. As shown in FIG. 3, a user device 302, which may or may not be a wearable device, tracks a performance, status or behavior of a user to generate sensor events (SE) and may send the raw sensor events from the user device 302 to a Dynamic Content Services System 304. The sensor events may be tracked and generated by an application or game engine which may be included in the user device 302 or may be configured to communicate with the user device 302 to receive sensed information from the user device 302. Sensor events (SE) provided by both a content requestor and a content creator may be continuously and automatically collected by the system 304 in order to create, improve and dynamically adapt behavior models built by the system 304 on a real-time basis.

The Dynamic Services System 304 may, similar to patterns of events guided content creation and consumption service 204, be a server made up of a number of modules which are configured to receive, store, process and output content, information and/or data. In particular, each module may include one or more processors and/or memory devices to process and store information. In addition, each module may be combined with other modules without departing from its intended processes and functionalities. The system 304 may process the sensor events (SE) to generate event patterns (EP) based on behavior models (VStats). The system 304 may transmit a request to a content creator device 306 to create content for a user device 302 (e.g., a requestor device). In the request, the system 304 may provide the event pattern (EP) in the request to the content creator device 306.

Upon receiving a content request from system 304, the content creator device 306 may generate content based on the event pattern (EP) and any context information associated thereto. The generated content may then be provided by the content creator device 306 to the system 304. The system 304 may then store the generated content and provide the generated content to a user device 302 that has requested the content. The system 304 may then continue to receive behavior information and sensor events from the user device 302 and monitor the behavior information and sensor events of the requestor to assess the effectiveness of the provided content. If the system 304 determines that the provided content has been ineffective based on continued monitoring of behavior information and sensor events, the system 304 may update behavior models and event patterns, and request a content creator device 306 to update the generated content based on the updated behavior models and event patterns, or the system 304 may search for another qualified content creator device 306 and request content from the other content creator device 306 that may provide better results.

In an example, sensor events (SE) and context information may be transmitted by a user device 302 to the Dynamic Content Service System 304. The raw sensor events (SE) and context information may be filtered and formatted by a sensor event receiver and filter 308 to produce a sensor event vector (V) or a selected set of sensor event vectors (V), which may include a selected set of variables derived from the sensor events (SE) and context information. An example of a data model for a sensor event vector V may be defined as follows:

V={[AppID, TaskID, UserToken], [Avatar, weapon type], [ObjectiveList], [BioMetric, VitalSign], [Timestamp, Duration], [Position, Orientation], [MotionVectors], [GestureVectors], [ActionVectors], [other app specific data]}

A sensor event vector V may be further processed by an abnormal and predictive behavior assessment module 310 and may be fed into a VStats behavior model builder module. The abnormal and predictive behavior assessment module 310 determines whether a sensor event vector V corresponds to predictive behavior of a user device 302 to be used to build a behavior model, to abnormal behavior of a user device 302 which indicates a request for content is desired by the user device 302, or to a combination thereof.

A model builder module 312 may include a VStats behavior module builder 312a, which may generate statistical models VStats, and a VStats model data cube 312b, which may store and index statistical models VStats provided by VStats behavior module builder 312a for retrieval by the abnormal and predictive behavior assessment module 310. The VStats behavior module builder 312a may use different types of methods to generate statistical models VStats. For example, different types of statistical data may be defined and calculated to assess the average and abnormal value of sensor event vector V. The average values and abnormal values, according to a model, may be defined as one or more ranges, one or more thresholds, one or more data points, or a combination thereof. AppID and taskID may provide the high level context to support application specific matching rules down to the task level. Avatar and weapon type may be used to support a game with multiple character types and weapons used in the game that have different capabilities. A target exercise Heart Rate may be Heart Rate=[85-140] as 50% to 85%. A walking speed may be walking speed=1.2-1.6 m/s for 50% to 85% of human. An average motion trajectory may be the average motion trajectory at coordinate (Longitude, Latitude)={avg$V_x$:1.3, avg$V_y$=0.9}. An average score earning rate may be included for GameX.SessionY, ScoreRate={Avg: 2000, Std: 600}. An average score for one specific game may be X={Avg:34000, Std: 4600}. In an example, the statistical models may be context aware and change over time, space, and applications. The results of the model builder 312a may be saved in a data cube 312b to track the statistical models VStats efficiently.

Based on the statistical model VStats, the input sensor event variables may be analyzed and tested to obtain a score (e.g., a percentile of the input sensor event variables) against the distribution model VStats, in real-time to generate a set of attributes defining the scores of a "problem" assessment vector "B".

For example, the following types of behavior problems may be defined based on a percentile of the population from the VStats distribution.

B.Bio={TargetHeartrate: 0.7} //Detect a higher than normal exercise heart rate.

B.Motion={Disorientation: 0.8} //Detect a player or a biker changing direction more frequent than normal and did not move to targeted destination B.Action={Inaction: 0.8, Slowness: 0.9} //Detect player did not act and/or is slow.

B.Perf={GameID: GameX, Session: Y, ScoreRate: 0.2} //Detect player did not make progress as expected.

The abnormal and predictive behavior assessment module 310 may generate event patterns (EPs) based on one or more received statistical models VStats and sensor event vectors V. Multiple different types of behavior problem summaries may be added to the event patterns (EPs) to establish context and to guide the content creation process. The resulting score for each variable represents the behavior problem assessment vector, B, which may be included in generated EPs. The EP may be sent to a proximity EP pattern matching and creator selection module 314 to select content creators 306 with similar EPs to the EP generated by the abnormal and predictive behavior assessment module 310. The proximity EP pattern matching and creator selection module 314 may further use proximity information received from user devices 302 to select content creators 306 with similar EPs to the EP generated by the abnormal and predictive behavior assessment module 310 and that are in a proximity to the user device 302 that is requesting the content. A proximity may refer to a proximity in a real-world or in a virtual world environment depending on the application. EPs derived from both creators and requestors may be stored and indexed in a user EP data cube 316 for referencing, searching and retrieval by the proximity EP pattern matching and creator selection module 314. An EP may consist of a sequence of detected behavior problems [B(t−w), . . . , B(t)] associated with an application context, a user objective, and an environment description. An example of an EP may be given as follows:

EP={[AppID, TaskID, UserToken], [ObjectiveList], [Environment Description] [B(t−tw), . . . , B(t)], V}, where, tw=1, . . . , w B(t−1)={B.Bio: {TargetHeartrate: 0.8}, B.Motion: {Disorientation: 0.8}, B.Perf: {ScoreRate: 0.2, Timestamp: TS1}

B(t)={B.Motion: Inaction: 0.9, Timestamp: TS2}

In an example, according to FIG. 3, users (both requesters and creators) 302 send sensor events and application context information ("Sensor Events") to system 304 for the system 304 to build VStats and Event Patterns (EPs). The system may then send a request to a creator 306 ("C") to create content for a requestor 302 ("R") based on a matched EPs between R and C ("Create(C, R, EP)"). Content generated by the content creator 306 may then be delivered to the system 304 ("D(C, R, Content, EP)") and stored in a content delivery queue 318. The content stored in the content delivery queue 318 may then be delivered to the requestor 302 for consumption by a user ("Get(R, EP, C, Content)").

Figure 4:
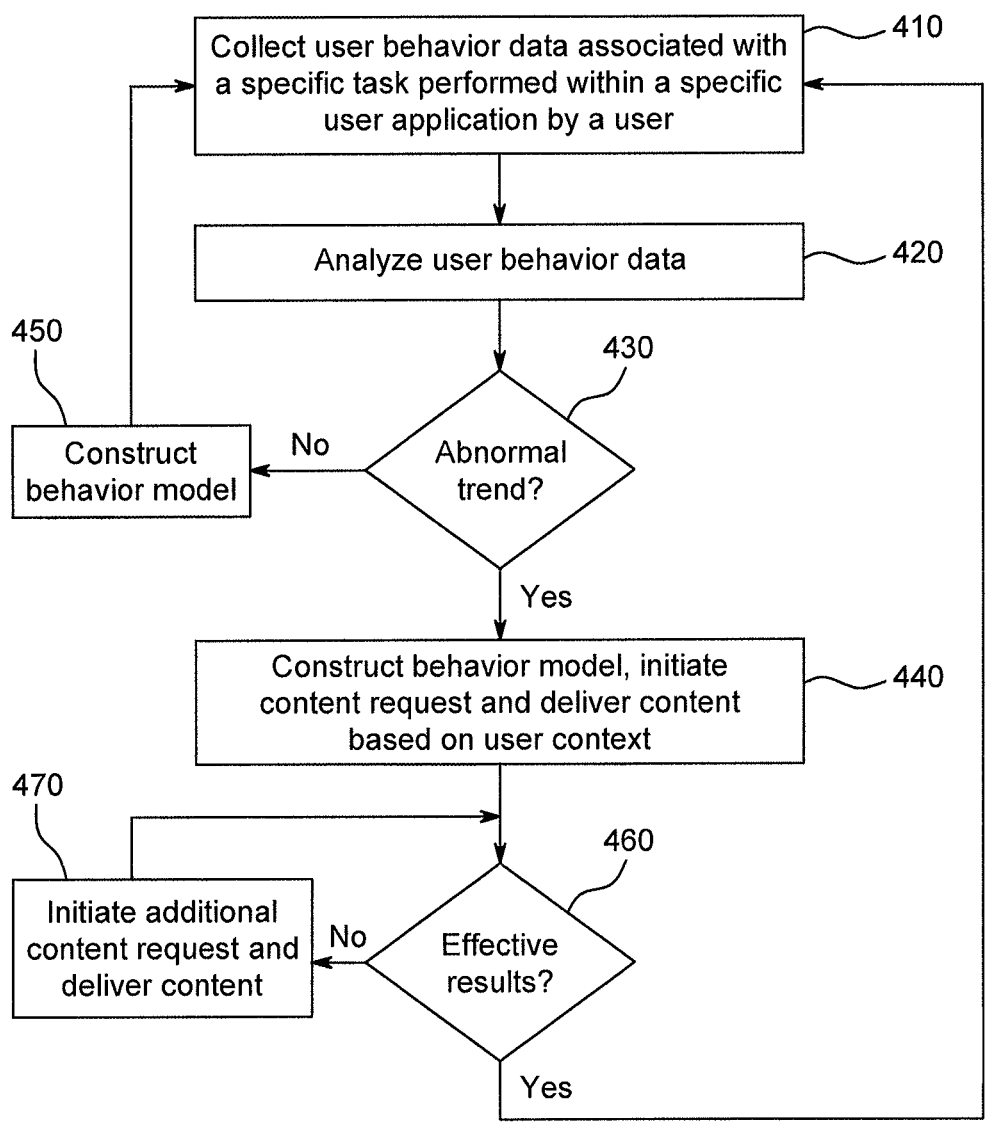
FIG. 4 is a flow diagram of an example of user data collection and delivery service.

FIG. 4 is a flow chart 400 illustrating an example method. The method of flow chart 400 may be implemented using any suitable mechanism or method, including, for example, those shown and described with respect to FIG. 2, 3 or 5-7.

According to FIG. 4, user behavior data, which may include user performance data or user status information, associated with a specific task performed by a user within a specific user application may be collected in step 410 (e.g., sensor events and context information). The user behavior data may be analyzed in step 420. If an abnormal trend in the user behavior data is detected in step 430, a content request may be initiated and the content delivered to the user in step 440. The content is intended to be effective to maintain user performance and satisfaction levels for the specific task. In addition, the abnormal user behavior data may be used to construct statistical distribution and predictive analytic models (i.e., behavior models) in step 440. If an abnormal trend in the user behavior data is not detected in step 430, statistical distribution and predictive analytic models (i.e., behavior models) may be constructed using data collected from users in step 450. That is, in view of steps 440 and 450, it will be appreciated that all user behavior data may be predictive and that any user behavior data, whether abnormal or normal, may be used as a source or input for constructing statistical distribution and predictive analytic models (i.e., behavior models). This is because all user behavioral data may be used to define a threshold for what is and/or what is not normal, and behavior models may be constructed and updated based on all user behavior data available. In addition, some users from which data is collected from may be qualified specialists or users with situational experience that matches a specific situation, environment or other user context. Qualified specialists may be identified by user input or the system may determine autonomously which users are qualified specialists by analyzing historical trends from their provided user behavior data and/or provided content. For example, user behavior data provided by a user (e.g., user behavior data which corresponds to a high score in a gaming environment, or fastest task completion time) determined to be over a specified effectiveness or rating threshold, may qualify the user as a qualified specialist. Similarly, content provided by a user to be delivered to a content requestor that is determined to be over a specified effectiveness or rating threshold, may qualify the user as a qualified specialist. Peer ratings may also be supplied by other users to qualify a user as a qualified specialist Once the content is delivered to the content requestor in step 440, the delivered content is analyzed for effective results in step 460. If the content does not achieve effective results, an additional content request is initiated and the additional content is delivered to the user in step 470.

Various types of event and condition parameters and choices of deliverable content may be programmable for different use cases. For example, data may be collected and models built for overall level of play of the user, motivation for playing, temperament of play, amount of money the user usually spends and under what circumstances, user context, or user performance.

Overall level of play may include a level of mastery of the user, i.e., whether they are a master or a novice level player. Motivations for playing may include winning, social interaction, or experience. Temperament of play may include speed or other conditions. For example, temperament may indicate aggressive or slow play. The amount of money the user spends may be real money or some substitute for money, such as credits, in-game gold pieces, and so forth which are usable in a specific game.

User context may include a location from which the user usually plays, such as home or school, a device used or usually used by the user when playing from a particular location. For example, a user may usually use a tablet on the bus, or a PC at home. User context may also include an amount of time the user usually plays or usually plays in the various locations using the various devices, or other correlations regarding user location, device, and/or in-game behaviors. User performance may be in the context of the user's past performance or in relation to other players or similar players.

User performance may be measured, for example, as a number of times the user failed to acquire a game resource or score that the user or another user would normally succeed in acquiring/attaining, an amount of time taken to complete a quest, level, or other task within a game beyond that normally taken by another user with similar experience, or the user's efficiency in using game resources. User efficiency may be calculated for example by comparing the efficiency of a path taken by the user within a game world to accomplish a task with the efficiency of paths taken by other or comparable users.

Based on a predicted abnormality trend, one or more event and/or condition detection rules may be invoked, which in turn may execute one or more content delivery actions in order to provide the user with virtual resources that may enable a user to enhance performance or improve a user experience.

The following is an example pseudo code to illustrate the proximity event pattern matching and creator selection function module 314 shown in FIG. 3. The example shows one possible implementation using an event processing rule to filter a disoriented user with low score and has been inaction for a while. On detecting such user, the system may match the App Id and Task ID with other active users who have good performance within a time window of 60 second. Within the small time window, the good performance user may have either completing the session of the task or about to do the task. In either case, the 3D engine of the creator may keep the 3D action, context, and environment content in cache and render the content (e.g., animation sequence data) for the requestor that have been detected to have problem when performing a task.

An example of the code used in the proximity event pattern matching and creator selection function module 314 may be:

```
/* Assume that a set of custom function package including calculating L2
Distance, L2Distance( ), creating content, create( ), and notify( ) are ready for
use. For example,
Import Custom.package.L2DistanceCalulation L2Distance...
A sequence of problem assessment vector Btn, Bt2, Bt1 are also included in
the events*/
Rule: "Create coaching content for disorientation users in NewExampleQuest
Level 3."
When
    //Detect players likely to be disoriented, have low scores, and
    being inaction
    $Requestor: EP((AppID == "NewExampleQuest", TaskID == "Level 3"),
            $RequestorPosition: Position( ), //
            (Bt2.B.Motion.Disorientation > 0.70),
            (Bt1.B.Motion.Disorientation > 0.75), //Increasingly
                disoriented.
            (Bt2.B.Perf.ScoreRate < 0.35),
```

```
            (Bt1.B.Perf.ScoreRate < 0.30), //Decreasing performance.
            (Bt1.B.Motion. Inaction> 0.85) //Inaction longer than
                normal.
            )
        from entry-point "RequestorEPs"   // from data requestor data
            stream.
//Find creators with good performance who is using the same
App/Game task within 60 second window before or after the
requestors. */
$QualifiedCreator: EP((AppID == "WordQuest", TaskID == "Level 3",
            $CreatorPosition: Position( ),
            (Bt1.B.Perf.ScoreRate > 0.7),
            (Bt1.B.Perf.scoreRate - $Requestor.Perf.ScoreRate > 0.2),
        /* ... Other criteria for selecting a skillful and qualified content
    creator */
            ...*/
        /*Match temporal events interval between creator and requestor
*/
            this include [60s] $Requestor)   //Creator events time
            window
                // include the requestor event
        )
        from entry-point "CreatorEPs"
Then
    /*Select a list of qualified creator in the radius of
    "MaxL2Distance" of the requestor's position. Use custom
    function to calculate the L2 distance. */
    $SelectedCreator: List( ) from accumulate(
        $QualifiedCreator( $CreatorPosition : Position),
        Radius = L2Distance($CreatorPosition, $RequestorPoistion);
        Radius < MaxL2Distance,
        collectList($QualifiedCreator) //Collect a list of qualified
    creators
        )
    /*Call the creator service interface to create content for
    requestor Requestor.token and with the EP, Requester.EP (e.g.,
    event pattern with AppID, TaskID, Env, Obj, and problem
    assessment vectors, other custom attributes). */
        For all ($SelectedCreator in collectList) {
            Create($SelectedCreator.Token, $requestor.Token,
            $Requestor.EP)
            Notify (EP.UserToken) //Notify the user to get the content from
            the PlayerX
        }
End
```

The above example illustrates the function steps and sample pseudo codes to show one example of the basic event pattern matching function used in the dynamic creator and requestor matching service. In further examples, a large set of rules may be executed in parallel in multiple rule engines.

Example automated support service scenarios are disclosed herein. Based on the data models and event pattern processing rules, the proposed dynamic content creator and requestor matching services may apply to multiple different pervasive personalized service application areas such as healthcare, education game, and fitness applications. The following examples describe new pervasive application scenarios that may be supported by the matching service efficiently in more details.

The matching service may efficiently support healthcare patient rehabilitation scenarios. An example is a pervasive rehab application designed for multiple patients and specialists with monitoring cameras, wireless hearing aid headsets and 3D graphic animation engines.

Figure 5:
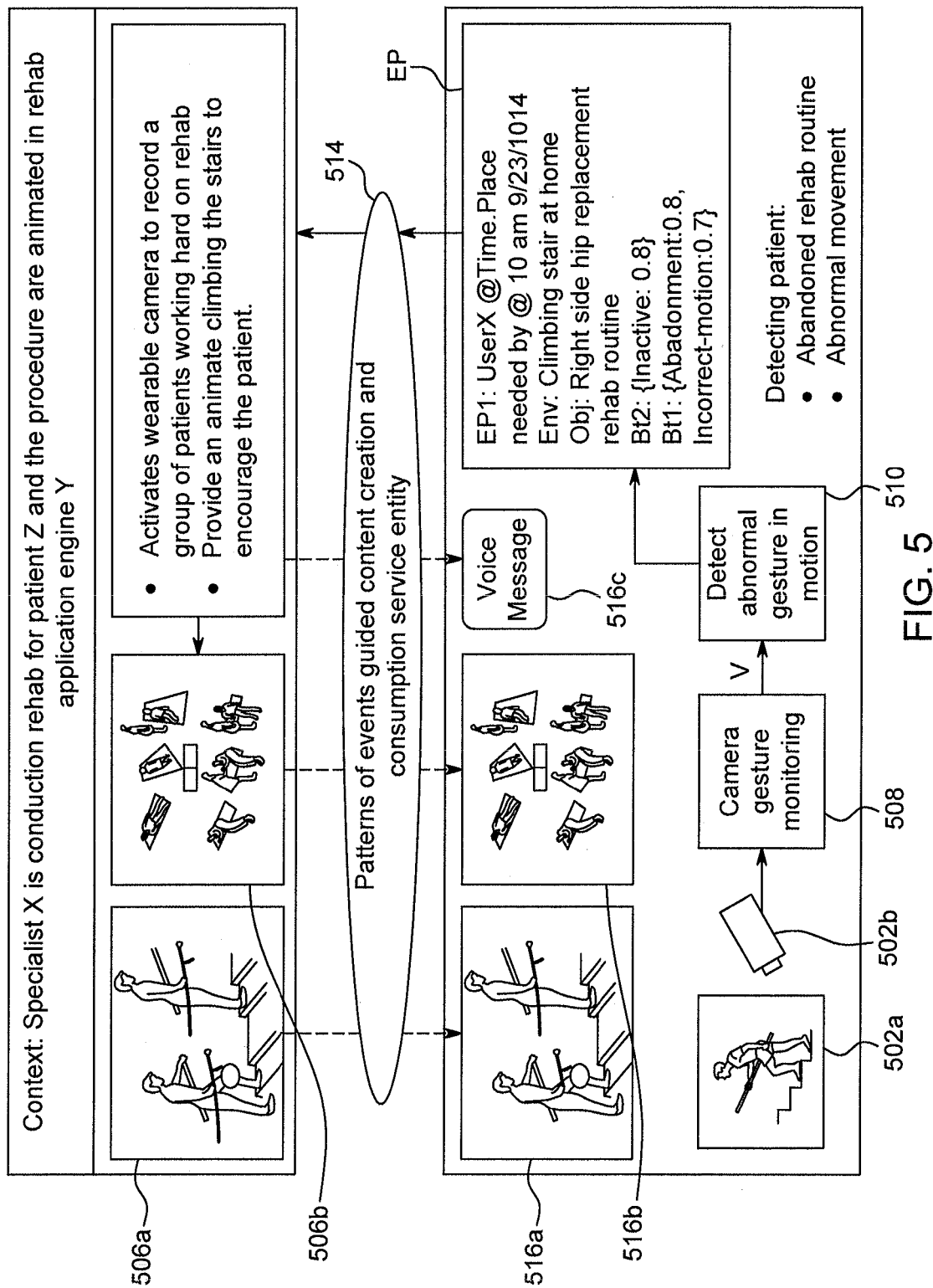
FIG. 5 is a diagram of an example of healthcare hip replacement rehab routine training and motivation content generation.

FIG. 5 is a diagram of an example of healthcare hip replacement rehab routine training and motivation content generation. As shown in FIG. 5, the rehab routing scheduled for each patient may be monitored by a group of specialists with a camera, which may be a wearable camera depending on the monitored activity. At the same time, the specialists may be conducting scheduled therapy for one or more patients at home or in multiple rehab centers. The example shows a patient 502a which had right hip replacement surgery and is scheduled to conduct the physical therapy at home. A remote camera 502b may be set up to monitor the patient's motion, gesture and facial expressions. A 3D virtual graphic engine 502c may map motion and gestures into an avatar in a 3D virtual world with geometry and space similar to the patient's exercise area using available 3D mapping techniques (e.g., MICROSOFT KINECT). A set of sensor variables V, may be extracted from the 3D virtual graphic engine 508 and analyzed by a behavior assessment module 510 to detect abnormal gesture and action patterns by comparing the behavior patterns of the user with an expected normal behavior pattern. Abnormal behavior patterns may include inactivity, improper movements, improper routine or the like. 3D tracking in the game engine or 3D virtual reality engine may provide friendly user interface and may not require additional 3D rendering software in a separated vision system.

A behavior model builder, such as that shown in FIG. 3, may construct the statistical distribution and predictive analytic models using data collected from qualified specialists. Based on the normal behavior patterns, the module detecting abnormal motions and gestures may produce a sequence of problem assessment vectors, Btn, . . . , Bt2, Bt1. An event pattern (EP) may consist of the following information sent to the event pattern matching engine.

EP1: UserX @Time.Place
Needed by @ 10 am 9/23/1014
Env: Climbing stair at home
Obj: Right side hip replacement rehab routine
Bt2: {Inactive:0.8}
Bt1: { Abandonment:0.8, Incorrect-motion:0.7}

At the same time, on-going rehab sessions 506a and 506b with specialists may also be monitored by a system and which results in the generating of EPs. These EPs may contain qualification information of the specialist, the types of rehab, and the context of the tasks that the specialist is working on. Based on the EP detection rules designed for matching the event patterns from qualified specialists and the patients, administered by the patterns of events guided content creation and consumption service 514, a specialist who is currently conducting the same rehab routine for a right hip replacement patient may be selected to generate the video automatically. Note that in this case, the objective of the event may contain the requirement for right hip replacement patient rehab routine. No left hip replacement patient or other types of rehab patient may be selected.

When a specialist is selected, the content creation may start automatically upon the permission or by default enabled for the wearable device used by the application. The created content 516a, 516b and 516c may be a voice recording, a 3D animation sequence generated from a camera in the rehab center, or a live video shot from the wearable camera of a rehab session that specialist instructs a patient with similar condition. When patient has a special condition specified in additional attributes in the event (e.g., right side hip replacement), the specialist may add the recorded content with annotated voice to remind the patient to use the correct foot to climb up or down the stair. If the patient has been in "inaction" (e.g., missing multiple sessions), the specialist may send a group therapy video to encourage the patient according to the patient's scheduled rehab routines.

The matching service may also efficiently support educational game tutorial generation scenarios. Another example service scenario is for in-app and in-game tutorials generation from real-time users and players in similar application and games running concurrently. In this scenario, play logs from students with high scores may be used to provide examples for students having difficulties navigating through the game space or solving the puzzles.

Figure 6:
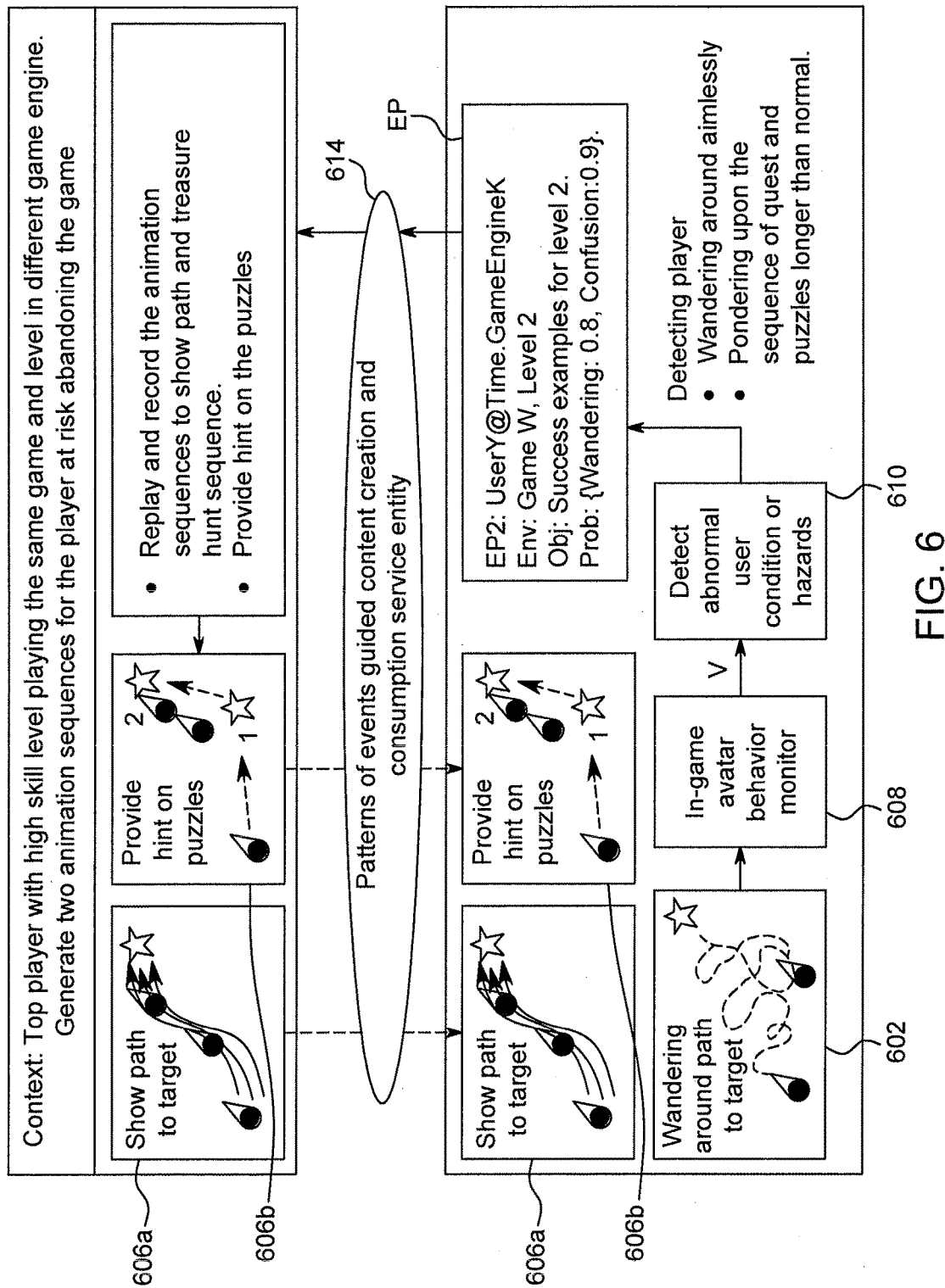
FIG. 6 is a diagram of an example education game with real-time guidance and warnings generated from qualified players.

FIG. 6 is a diagram of an example education game with real-time guidance and warnings generated from qualified players. As shown in FIG. 6, trajectories or facial expressions of a user 602 detected by sensors (not shown) may be animated by an in-game avatar controlled by a student. The user may encounter difficulties such as: wandering around or staying in places longer than normal compared to other players with high scores; inaction upon the sequence of puzzles longer than normal; changing avatar direction aimlessly and is away from the target defined in the game; and getting wrong answers multiple times more than an average of other users.

When the user encounters these difficulties, the system may detect these difficulties via an in-game avatar behavior monitor 608 and may generated and send an EP with a summary problem description to the creator and requestor matching service via behavior assessment module 610. The event pattern (EP) may contain the following context information:

EP2: UserY@Time.GameEngineK //The game engine that the user is currently using.
Env.: Game W, Level 2 //The game ID and level that the user is having difficulties.
Obj: Success examples for level 2. //Find a user who has successfully pass level 2
Bt1: {Wandering: 0.8, Confusion: 0.9}. //Assessments on problems of the user.

Based on the context of the environment, objective, and problem assessment vector information, a qualified player who has high score and moved quickly passed the level may be selected. A sequence of play logs recorded by the good player's 3D game engine may be extracted as created content 606a and 606b, transferred, and rendered in the place where the student is having difficulties via the patterns of events guided content creation and consumption service 514.

This example illustrates some of the following example features of an event guided content creation system disclosed. The players may not need to go on-line to look for content posted by other users. If the student may not be actively participated in the education game, proactive tutorial generated from classmate may motivate the student to catch up. The game developer may not need to develop detailed animated scenarios for all possible situations that the student may have problems with. The tutorial content of different variations may be generated from the play logs of the better and more enthusiastic users. Recording of animated play sequences for important player event patterns, such as animation path to a treasure, kill a monster, and answer to solve a puzzle, may not take as much storage as recoding rendered video clips. Play back of the "key events" in play log may also be much easier to use to drive a coaching avatar in the requestor's 3D world.

A further example feature includes that when a user starts the game, multiple different types of avatars may be created from other players that may provide multiple guided tours for the new player. The player may be engaged in the education game when other players' play logs may be synchronized with the player as if they are trying to solve the puzzle at the same time or taking a treasure hunting tour together. The event patterns may constantly guide the generation of new content from other players and blended into the player's 3D world. This may help the user stay engaged in the game. Further, selecting qualified users to create content may avoid the potential distraction from abusive players in multi-play games. The selected content creator may provide quality support to the content requestor to guide the player toward a positive direction rather than the distractions that may frequently occur in a multiplayer game.

The matching service may also efficiently support biking trail mobile fitness app scenarios. In an example, the dynamic content creation model may also apply to pervasive services combining augmented reality, surveillance and virtual world application with motion, location, orientation and time sensitive guidance and warning content.

Figure 7:
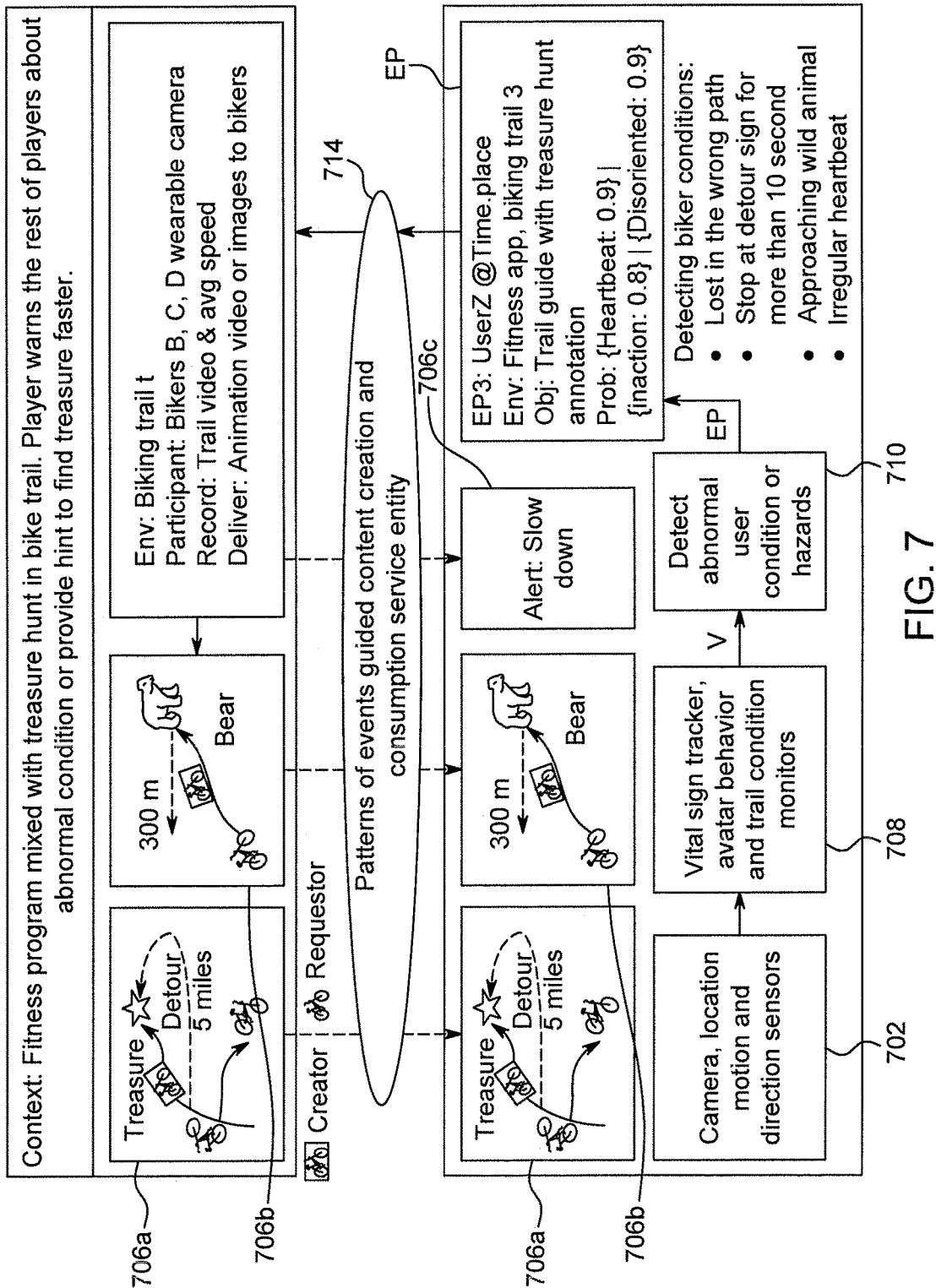
FIG. 7 is a diagram of an example fitness game with real-time guidance and warnings generated from qualified players.

FIG. 7 is a diagram of an example fitness game with real-time guidance and warnings generated from qualified players. As shown in FIG. 7, a biker may have participated in an augmented reality application with 3D mapped treasure hunt and avatars animated personal coach. The biker's trajectory and orientation may be tracked (for example, through a GPS and compass 702) and mapped into an avatar in a 3D world via behavior and conditions monitor 708 and behavior and conditions assessment module 710, as similarly described above. Selected content creators may display content 706a and 706b in the virtual world based on the behavior event patterns of the content requesting bikers. For example, when the biker encounters problems such as, for example: being lost in the wrong path; being stopped at a detour sign for more than ten seconds; approaching a range (for example, 300 meters) close to a wild animal sighted by other bikers; and displaying an irregular vital sign (for example, a heartbeat rate much higher than normal bikers in similar place).

These problems may be detected in the 3D virtual world (fused with the sensor data) and sent to the event pattern matching service 714 to match with other bikers' event patterns. Using the event detection mechanism described in FIG. 2, the bikers in the same trails and making good progress may provide guidance to the biker having problems. For example, the bikers may send the trajectory log to the augmented reality display engine to render trajectory in the augmented reality display of a requestor. Warning or alert message 706c may also be delivered to the requestor when the requestor approaching a dangerous area that other bikers may have spotted earlier or is encountering at the moment.

In an example, in addition to the event pattern matching based content creator selection process and proximity matching, the system disclosed herein may also integrate and utilize external web content aggregation sites, such as, for example, YOUTUBE, for archived content. Content creators may create content for one content requester and archive the content in anticipation of usage (for example, download) by web users or new requests from other content requestors subscribed to the dynamic content creation service. The archived content may be stored in the external web sites.

The content delivery queue shown in FIG. 2, may contain references to content archived (for example, posted) in multiple external content web sites such as, for example, YOUTUBE and TWITCH. The EPs associated with the dynamically created content as described in the previous sections may be stored in the EP data cube shown in FIG. 2, with references to the archived content in the external sites or in the content delivery queue. After matching with archived content, the system may use the references stored in the data cube to retrieve the archive content from external Website and store them into the content delivery queue to be consumed by requestors.

This external content archival integration may extend the dynamic content creation service to support networked content services for the types of content that are not sensitive to time or for those times when there may be no qualified content creator available on-line. For example, promotional tutorials with application ID, task ID and general EPs may be stored as descriptors for the content. In this case, the general EPs may be review score, and other qualification attributes such as avatar type. Since, potentially, a large number of content may be returned by searching based on AppID and TaskID, (as key words) from the Websites, the additional EP may be used as filtering criteria to select the most suitable content and filter out less relevant content to minimize the manual operation required from the requestors.

The dynamic event pattern guided content creation and consumption service disclosed herein may create an eco-system among the app/game developers, pervasive service providers, content creators, and content consumers. The system (e.g., system 304) disclosed herein may support the following features for different entities in the eco-system. The system may support customizable content creator and content requestor matching as a service. As an example, app/game developers may provide value added content matching rule group to implement new attributes for problem assessment vectors and qualification criteria to refine and expand the automated "support service menu" for a specialized content creator (for example, a coach) to offer more pertinent help with higher quality content. Also, the content matching service providers may charge a fee on the usage of matching rules. The more matching rules, the higher the subscription fees may be. The fee may be based on virtual currency or real currency. Users may also send virtual currency or real currency to each other. In this case, the content service provider may support the recording of content usages and monitor the currency transactions. In addition, the service provider may implement value based pricing to charge fee based on assessment on the progress of the content requestor. For example, if the content requestor used the tip provided in the content of a content creator to gain X virtual points, a percentage of the points may be retained by the service provider. The value based profit sharing may also include app/game developers and the content creators.

As a further example, the value of the content may be ranked. A service provider may track the player's EP and rank the efficiency of the content (for example, tutorial) based on progress of the requesting user who consumed the content. The system may give points to the content creator for content (for example, tutorials or training sessions) that may be helpful and deduct points otherwise.

As yet a further example, the system (e.g., system 304) may provide value based monetization. Content that may be useful to the content requestors may be given points based on a percentage of score that the user obtained from using the content. App and game developers may subscribe to the EP matching service to access the point system. The content service may use the point sharing system as incentive for participants to become qualified content creators by practicing and using the application more frequently and possibly in a specialty area. The specialty area may be defined by a behavior problem assessment vector, B, and a skill assessment vector, SV. Players with the best skills to solve the problem defined in assessment vector may be the most qualified to generate the tutorial content for the specified problem. Different than the specialists, content creators with best in class skill or points earned may be qualified as elite content creators. The elite content creators may be selected to create special promotional content requested by an organizer of special events for large number of users.

The system (e.g., system 304) disclosed herein may support various extended services described in the following examples. In an example, the system may provide a domain specific problem and qualification skill assessment service. The system may provide a problem and skill assessment tracking and storage service. It may support dynamic creation of new domain specific problem assessment attributes that may best assess the different types of problems of a user for different types of applications and games. For example, the following attributes may be added to define more types of problems the users may encounter: deficiency (deficiency in avatar control or knowledge of the game for first time player), aimless (aimless navigation in treasure hunting), hardship (hardship in solving puzzles), and confusion (confusion in usage of resources). These attributes may be used by different types of behavior assessment methods to calculate the severity levels of "problem" behavior for each application/game. For example, user X and Y may have different "problem assessment" vectors. The user with a smaller "problem" rating may offer help to the user with greater "problem" rating. For example, User_X may have a need-index where need-index={Deficiency: 0.8, Aimless: 0.2, Hardship: 0.2, Confusion: 0.7}. Also, User_Y may have a need-index where need-index={Deficiency: 0.2, Aimless: 0.3, Hardship: 0.8, Confusion: 0.1}. User_X may support User_Y on detecting deficiency in avatar control or confusion on the use of a new weapon.

In addition, the system (e.g., system 304) may also support a skill level assessment vector to qualify content creators across multiple applications and games. The skill vector may include generic player characteristics such as reaction time, accuracy, strategy, persistence, avatar control, navigation, and puzzle solving. Depending upon the types of the application and game profile, the skill vector may be used as additional criteria to qualify creators. High skill creators may form coaching teams or serve as personal trainer for individual content requestors.

As a further example, the system (e.g., system 304) may include a content stitching service. The system may monitor all of the EPs and progress made by the content requestor after consuming the content. As a result, the system may add content stitching rules to combine multiple content from multiple content creators based on the effectiveness of the content services. For example, the content stitching service may support the following content stitching rules. The service may group the content created for events such as passing a subtask, task, or a level (e.g., getting a treasure, solved one puzzle, kill a monster and avoiding a hazardous condition). In parallel, the service may rank the content used by the content requestor. Further, the service may select content based on ranks to provide alternative content for a subtask, a task or multiple tasks to one or more content requestors. For example:

---

If
    A user passed a subtask X after consumed content C within T. second,
Then,
    Save the (T, X, C) with the content creator ID, the EP used to create the content and the content itself.
    Track the average of T, $T_{avg}$ for each pair of (X, C) in a data cube.
If
    a qualified creator received new EP indicates that a user having problems with a task,
Then,
    select content for each subtasks that have smallest $T_{avg}$, for each (X, C) from multiple creators.

---

The above example may stitch content from one content creator who is most effective for one subtask (e.g., fighting a monster or hip rehab) with content created by another content creator who is the best for a different subtask (e.g., building a bridge or driving a race car). Note that C may contain metadata related to ID, title, date, and descriptors for the content and the content itself.

Further, the system (e.g., system 304) may learn the associations between the most frequent and time consuming subtasks and stitch together the highest ranked content for the highest ranked problems in the beginning of the game as a tutorial to beginners to reduce the chance that a user encounter a popular problem and abandon the game.

As a further example, the system (e.g., system 304) may include pre-recording and ranking services. Pre-recording may mean that the system may continue to record and keep a fixed amount of content over a pre-defined amount of recording time window. The proposed system may support pre-recording services so that a content creator will not miss the portion of the content which happened before the EP requested by the content requestor. In addition, the pre-recorded content may be ranked by comparing the user performance on the subtask with that of other users. For example, a game engine or the 3D graphic engine may log all the animation sequences continuously when a user has been identified as a qualified content creator. As a further example, to minimize the storage, the recording may only be kept for the section of play within a time window before an "important subtask events" such as solving a puzzle, entering a new space, or killing a monster. As another example, when the user has excellent performance for the subtask relatively to the average performance collected from multiple users (e.g., in the data cube), pre-recorded content may be kept for a longer period of time (e.g., kept the recording for the whole duration of the play when achieving excellent performance on the subtask). The performance ranking, PerfRank, may also be recorded as metadata along with the $T_{avg}$ as metadata. For example, a tuple (PerfRank, $T_{avg}$, X, Content meta data descriptor, C) may be stored in data cube with reference to the recorded content. The skills assessment, behavior assessment, problem assessment or effectiveness assessment, or a combination of these, may also be stored as metadata. The metadata may be stored with the content associated with the important subtask within the application or game session.

As a further example, the system (e.g., system 304) may include competitive content quality improvement services. The system may rank and keep a set of highly ranked content for each qualified content creator. The ranking may be based on multiple performance indicators of each creator, for example: a performance score on subtasks (e.g., PerfRank), length of the content (e.g., faster time to completion of subtask), a progress assessment of the content requestor who used the content (e.g., $T_{avg}$), and other user defined parameters. Further, the ranking may be based on multiple ranking rules, such as, for example, Rule 1: highest value on a specific indicator; and Rule 2: highest weighted sum of two or more indicators.

If the content creator cannot or did not create new content with a better performance indicator (for example, having a skill level, better score or better navigation), the previously recorded content may still be used to qualify the content creator. The content creators may make efforts to continue to improve their performance indicators to stay competitive with other content creators or to create more varieties of content. The content requestor may benefit from the continuous improvement or enjoy more variety of content.

As a further example, the system (e.g., system 304) may optimize content requestor and content creator matching services. The default matching method may include a sequence of pattern evaluation between the problem summary and skill assessment of the qualified content creators (e.g., coach) in the proximity of the content requestor based on temporal spatial trajectory in the application tasks and objectives. To support fast matching, the system may remember the high ranking content creators in the proximity of the content requestors. For example, a previously qualified content creator in the same app or game server may be selected before searching for matched events from other content creators.

Furthermore, to select suitable skill and performance levels of requestors (e.g., instructors), thresholds may be defined for each attribute of the problem assessment vectors such that the system may select content creators with "adequate" skill and performance levels to the content requestors. This adequate level threshold matching may increase the probability of finding a content creator in proximity of the content requestor to offer the content and prevent poor performers and beginners from receiving tutorials that are too advanced for their levels.

Although features and elements are described above in particular combinations, one of ordinary skill in the art will appreciate that each feature or element can be used alone or in any combination with the other features and elements. "Modules" and "cubes" described herein may be provided as a computer-readable medium for execution by a computer or processor. In addition, the methods and functions described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a server for dynamically providing content, the method comprising:
   receiving, at the server, first sensor events from an active user of a plurality of users, wherein the first sensor events correspond to behavior data detected from the active user of the plurality of users;
   identifying, by the server, content creator candidates from among the plurality of users, based on a pattern of events which correspond to the first sensor events received from the active user of the plurality of users;
   selecting, by the server, a content creator from among the content creator candidates based on a best match to the pattern of events;
   transmitting, by the server, a first request for first content of the selected content creator;
   receiving, at the server, the first content created by the content creator;
   transmitting, by the server, the first content created by the content creator to the active user;
   monitoring, by the server, progress of the active user based on a playback of the first content by the active user;
   receiving, by the server, second sensor events from the active user of the plurality of users, wherein the second sensor events corresponds to behavior data detected from the active user after the active user consumed the first content created by the content creator; and
   transmitting, by the server, a second request for second content for the active user on a condition that the second sensor events of the active user indicate abnormal behavior.

2. The method of claim 1, further comprising:
   receiving automatically, by the server, the first sensor events of the active user on a continuous real-time basis;
   detecting automatically, by the server, abnormal behavior from the first sensor events of the active user;
   generating automatically, by the server, the pattern of events in response to detecting the abnormal behavior; and
   transmitting, by the server, the first request for the first content of the selected content creator, wherein the first request for the first content is automatically generated in response to the pattern of events.

3. The method of claim 1, further comprising:
   receiving automatically, by the server, multiple sensor events of the plurality of users on a continuous real-time basis; and
   generating, by the server, a behavior model from the multiple sensor events of the plurality of users; and
   updating, by the server, the behavior model on a continuous real-time basis as the multiple sensor events of the plurality of users are received, wherein the behavior model serves as a basis for detecting abnormal behavior from the first sensor events of the active user and as a basis for generating the pattern of events.

4. The method of claim 3, further comprising:
   detecting automatically, by the server, the abnormal behavior from the first sensor events of the active user;
   generating automatically, by the server, the pattern of events, in response to detecting the abnormal behavior, based on the first sensor events of the active user and the behavior model; and
   transmitting, by the server, the first request for the first content of the selected content creator, wherein the first request for the first content is automatically generated in response to the pattern of events.

5. The method of claim 1, further comprising:
   providing, by the server, a rating for the first content delivered to the active user based on monitoring the progress of the active user utilizing the first content.

6. The method of claim 1, wherein the pattern of events includes context information corresponding to an environment of the active user.

7. The method of claim 1, further comprising:
   ranking, by the server, in response to the pattern of events, the content creator candidates based on comparing attributes in the pattern of events to attributes of pattern of events received from the content creator candidates;
   selecting, by the server, the content creator among the content creator candidates based on the ranking; and
   receiving and storing, by the server, the first content created by the selected content creator.

8. The method of claim 1, wherein identifying the content creator candidates includes searching for the content creator candidates based on similarities of application tasks of the content creator candidates to application tasks of the active user and proximity in time and space to the active user.

9. The method of claim 1, further comprising:
   generating, by the server, a sensor vector from the first sensor events, wherein the sensor vector includes a set of variables; and
   assessing, by the server, an average value and an abnormal value of the sensor vector using at least one behavior model, wherein the at least one behavior model is configured according to context information and changes dynamically over one or more of time, space and applications according to the sensor events received from user devices.

10. The method of claim 1, further comprising:
    generating, by the server, the first request for the first content based on an observation of user behavior in a specific application context, wherein the observation is based on analyzing data collected from the first sensor events provided by sensors monitoring one or more of user motion, gesture, facial expression, vital sign and biometric data.

11. The method of claim 1, further comprising:
matching, by the server, pre-recorded content and newly created content to the pattern of events of the active user based on weighted proximity matching attributes and content criteria, wherein the attributes include one or more of geo-distance, distance in a game world, time difference of synchronization events, experience level and review score.

12. The method of claim 1, wherein transmitting the first content includes retrieving the first content from at least one of the content creator in real-time as live content or from an archive as archived content created by the content creator.

13. A server configured to provide event pattern guided content services, the server comprising:
a receiver configured to receive first sensor events from an active user of a plurality of users, wherein the first sensor events correspond to behavior data detected from the active user of the plurality of users;
the at least one processor is configured to identify content creator candidates from among the plurality of users based on a pattern of events which correspond to the first sensor events received from the active user;
the at least one processor is configured to select a content creator from among the content creator candidates based on a best match to the pattern of events;
a transmitter configured to transmit a first request for first content of the selected content creator;
the receiver is configured to receive the first content created by the content creator;
the transmitter is configured to transmit the first content created by the content creator to the active user;
the at least one processor is configured to monitor progress of the active user based on a playback of the content by the active user;
the receiver is configured to receive second sensor events from the active user of the plurality of users, wherein the second sensor events corresponds to behavior data detected from the active user after the active user consumed the first content created by the content creator; and
the transmitter is configured to transmit a second request for second content for the active user on a condition that the second sensor events of the active user indicate abnormal behavior.

14. The server of claim 13, wherein,
the receiver is configured to receive automatically the first sensor events of the active user on a continuous real-time basis;
the at least one processor is configured to detect automatically abnormal behavior from the first sensor events of the active user;
the at least one processor is configured to generate automatically the pattern of events in response to detecting the abnormal behavior; and
the transmitter is configured to transmit the first request for the first content of the selected content creator, wherein the first request for the first content is automatically generated by the at least one processor in response to the pattern of events.

15. The server of claim 13, wherein,
the receiver is configured to receive automatically multiple sensor events of the plurality of users on a continuous real-time basis;
the at least one processor is configured to generate automatically a behavior model from the multiple sensor events of the plurality of users; and
the at least one processor is configured to update the behavior model on a continuous real-time basis as the multiple sensor events of the plurality of users are received, wherein the behavior model serves as a basis for detecting abnormal behavior from the first sensor events of the active user and as a basis for generating the pattern of events.

16. The server of claim 15, wherein,
the at least one processor is configured to detect automatically the abnormal behavior from the first sensor events;
the at least one processor is configured to generate automatically the pattern of events, in response to detecting the abnormal behavior, based on the first sensor events of the active user and the behavior model; and
the transmitter is configured to transmit the first request for the first content of the selected content creator, wherein the first request for content is automatically generated by the at least one processor in response to the pattern of events.

17. The server of claim 13, wherein,
the at least one processor is configured to rank, in response to the pattern of events, the content creator candidates based on comparing attributes in the pattern of events to attributes of pattern of events received from the content creator candidates;
the at least one processor is configured to select the content creator among the content creator candidates based on the ranking; and
the receiver is configured to receive and store the first content created by the selected content creator.

18. The server of claim 13, wherein:
the at least one processor is configured to produce a sensor vector from the first sensor events, wherein the sensor vector includes a set of variables; and
the at least one processor is configured to process the sensor vector and assess an average value and an abnormal value of the sensor vector using at least one behavior model, wherein the at least one behavior model is configured according to context information and changes dynamically over one or more of time, space and applications according to sensor vectors received from user devices.

19. The server of claim 13, wherein the transmitter is configured to transmit the first content by retrieving the first content from at least one of the content creator in real-time as live content or from an archive as archived content created by the content creator.

* * * * *